(12) United States Patent
O'Connor

(10) Patent No.: US 7,200,951 B2
(45) Date of Patent: Apr. 10, 2007

(54) ELECTRICIAN'S MEASUREMENT APPARATUS AND METHOD OF USE

(76) Inventor: James J. O'Connor, 20 Rosemont Rd., Oak Ridge, NJ (US) 07438

( * ) Notice: Subject to any disclaimer, the term of this patent is extended or adjusted under 35 U.S.C. 154(b) by 0 days.

(21) Appl. No.: 10/652,115

(22) Filed: Aug. 30, 2003

(65) Prior Publication Data

US 2004/0035015 A1 Feb. 26, 2004

Related U.S. Application Data

(63) Continuation-in-part of application No. 09/500,762, filed on Feb. 8, 2000, now abandoned.

(51) Int. Cl.
*G01B 1/00* (2006.01)
*G01B 3/00* (2006.01)

(52) U.S. Cl. .................. 33/528; 33/DIG. 10
(58) Field of Classification Search .............. 33/528, 33/613, 494, 679.1, DIG. 10, 1 G, 563, 759
See application file for complete search history.

(56) References Cited

U.S. PATENT DOCUMENTS

| | | | | |
|---|---|---|---|---|
| 2,713,203 A | 7/1955 | Gottlieb | ................ | 33/1 |
| 2,919,913 A | 1/1960 | Phair | ............... | 269/115 |
| 2,990,172 A * | 6/1961 | Gianotta | ............ | 269/50 |
| 2,992,490 A | 7/1961 | Hay et al. | ............ | 33/174 |
| 3,183,596 A | 5/1965 | Shaw | ................ | 33/90 |
| 3,436,070 A | 4/1969 | Utley et al. | ............ | 269/8 |
| 3,842,510 A | 10/1974 | Elliott | ................ | 33/180 R |
| 4,126,941 A | 11/1978 | Clarke | ................ | 33/180 R |
| 4,793,069 A * | 12/1988 | McDowell | ............ | 33/528 |
| 5,072,523 A * | 12/1991 | Bennett | ............ | 33/528 |
| 5,111,593 A * | 5/1992 | Gehen, Sr. | ............ | 33/613 |
| 5,222,303 A | 6/1993 | Jardine | ............ | 33/528 |
| 5,361,509 A * | 11/1994 | Wheeler et al. | ............ | 33/528 |
| 5,509,212 A * | 4/1996 | Henricksen | ............ | 33/565 |
| 5,598,638 A | 2/1997 | Plesh | ............ | 33/528 |
| 5,615,490 A * | 4/1997 | Burchell | ............ | 33/528 |
| 5,860,219 A | 1/1999 | Wilkinson | ............ | 66/528 |
| 5,966,828 A * | 10/1999 | Hickey | ............ | 33/528 |
| 6,233,838 B1 * | 5/2001 | Falwell et al. | ............ | 33/528 |
| 6,571,487 B1 * | 6/2003 | Canalle | ............ | 33/760 |

\* cited by examiner

*Primary Examiner*—Gail Verbitsky
*Assistant Examiner*—Mirellys Jagan
(74) *Attorney, Agent, or Firm*—Ernest D. Buff & Associates, LLC; Ernest D. Buff; Theodore J. Pierson

(57) ABSTRACT

The positions of electrical boxes, switches and outlets are marked and accurately located by use of an integrated measuring apparatus having multiple sets of slots, indicia printed on left and right edges of the front side of the apparatus, and levels for positioning the apparatus vertically. The integrated electrician's measurement apparatus locates the electrical boxes, switches and outlets in horizontal level even when an irregular floor is present. Such electrical devices are positioned at required distances that meet code requirements without need for additional tools. Location and installation of the boxes is facilitated. The boxes are positioned quickly and accurately in compliance with applicable code requirements. Portions of pertinent sections of the code are provided for ready reference on the body of the integrated electrician's measuring apparatus.

3 Claims, 4 Drawing Sheets

Fig. 2

| NBC Summary of Branch-Circuit Requirements | | | | | |
|---|---|---|---|---|---|
| CIRCUIT RATING | 15 Amp | 20 Amp | 30 Amp | 40 Amp | 50 Amp |
| CONDUCTORS: (Min. Size) | | | | | |
| Circuit Wires* | 14 | 12 | 10 | 8 | 6 |
| Taps | 14 | 14 | 14 | 12 | 12 |
| Fixture Wires and Cords | | | | Refer to Section 240-4 | |
| OVERCURRENT PROTECTION | 15 Amp | 20 Amp | 30 Amp | 40 Amp | 50 Amp |
| OUTLET DEVICES: | | | | | |
| Lampholders Permitted | Any Type | Any Type | Heavy Duty | Heavy Duty | Heavy Duty |
| Receptacle Rating** | 15 Max. Amp | 15 or 20 Amp | 30 Amp | 40 or 50 Amp | 50 Amp |
| MAXIMUM LOAD | 15 Amp | 20 Amp | 30 Amp | 40 Amp | 50 Amp |
| PERMISSIBLE LOAD Refer to section | 210-23(a) | 210-23(a) | 210-23(b) | 210-23(c) | 210-23(c) |

*These gauges are for copper conductors.
**For receptacle rating of cord-connected electric-discharge lighting fixtures, see Section 410-30(c).

—20

—22

ELECTRICIAN'S MEASUREMENT APPARATUS AND METHOD OF USE

CROSS-REFERENCE TO RELATED APPLICATIONS

This is a Continuation-In-Part of application Ser. No. 09/500,762, filed Feb. 8, 2000 now abandoned.

BACKGROUND OF THE INVENTION

1. Field of the Invention

The present invention relates generally to measurement devices; and more particularly, to an apparatus and method of use for measuring a variety of spatial dimensions pertaining to the installation of electrical boxes, outlets switches and the like.

2. Discussion of the Prior Art

The prior art includes numerous examples of rulers and tapes, which can be advantageously employed in a plethora of common applications which require installing and building. To some extent, these prior art devices limit the need for manual measurement, and the arithmetic errors associated with cumulative measurement. Accordingly, less skilled persons can utilize these devices to perform an installation, which normally would require expertise.

One example of a conventional measurement device is disclosed by U.S. Pat. No. 4,012,590 to Wagner et al. entitled "Disposable Layout Tape", which is directed solely toward measuring for the positioning of building materials such as studding, joints, and rafters. The measuring device taught by Wagner et al. is a layout tape having an adhesive backing which is left in place within the building upon completion.

Another example is disclosed by U.S. Pat. No. 4,584,780 to Pressey, entitled "Layout Template for Electrical Panel". Pressey discloses a rectangular sheet with spaced holes for marking where conduits should be located in an electrical panel.

Still another example, disclosed by U.S. Pat. No. 1,643, 695 to Bunger, relates to a measuring tool for marking and laying out window frames and parts, and doorframes and parts.

U.S. Pat. No. 2,713,203 to Gottlieb discloses a house framing device. A measuring strip geometry has slot like openings 13, 14 placed on both edges of the strip. The device can additionally be provided with slots 5, 6, placed within the strip to measure off a fixed distance from an end thereof. There is no means provided for measuring off a desired dimension from the end; no guidance is provided to mark a cutting line that is horizontal and at a fixed distance from the floor. The width of the strip member is rather narrow making it difficult to place the device squarely on a floor; this is especially the case if the floor is not a flat surface.

U.S. Pat. No. 5,913,586 to Marshall discloses a tape measure. The tape measure is marked with indicia on both edges, permitting measurement from either side. The tape is narrow, thin and flexible, making it difficult to lay along a wall when measuring out precise dimensions for an electrical box. In addition, no guidance is provided for placing the tape measure in a vertical orientation or for placing it properly for measurement on a floor which is not flat.

U.S. Pat. No. 5,222,303 to Jardine discloses a template for marking the location of junction boxes. A template which is slightly larger than the junction box representing the cutout for a junction box is provided at a fixed distance from one end of this foldable device. Two levels are provided for horizontal and vertical directions. One edge of the device is provided with indicia markings. The overall width of the device is approximately ¾ inch. Since the device is not very wide, it does not position properly when the floor is not flat. Box dimension measurements are accurate only when made according to a template, which provides fixed dimensions of 3 inch×4 inches or 3 inches by 2 inches at a specific height designed by the device. Moreover, the template does not mark off an exact dimension, since the template is larger than the junction box. It is not readily possible to use the Jardine device to place electrical boxes at different locations, since the indicia is only marked on one side of the device. Further, the Jardine device is not very wide and does not automatically pick the highest point on the floor to locate the device and place it in a vertical position using the level. A horizontal line cannot be drawn since indicia are not provided both edges of the device.

There remains a strong need in the art for an easy to use integrated measuring tool that assists the user to properly locate electrical boxes and other electrical fixtures including switches, plugs and the like. Electrical boxes, switches, and plugs must be located in a horizontal plane above the floor at required distances meeting various codes regardless of the horizontal level or flatness of the floor.

SUMMARY OF THE INVENTION

One object of the invention to provide both a measuring tool and a template for laying out electrical boxes of many kinds, including outlets, switches, and fixtures, according to the specifications of a variety of standards and codes.

Another object of the invention is to eliminate the need for knowledge of these codes and expertise in measuring, as the preferred location of the electrical boxes, according to the relevant code, is indicated visually on the device and also by a slot which allows for easy marking of the base surface.

Yet another object of the invention is to assist in the installation of electrical devices precisely in a vertical direction by providing a level and plumbing indicators.

A further object of the invention is to eliminate the need for consulting numerous reference manuals by displaying portions of the relevant codes on the device so that it serves as a reference tool. The device includes a standard scale so it may also be used as an ordinary ruler.

These objects are realized in accordance with the present invention by an integrated electrician's measuring apparatus for marking and locating the position of electrical boxes. Generally stated, the integrated electrician's measuring apparatus comprises: an elongated body having a first and second end; a set of levels incorporated in the elongated body for locating the integrated electrician's measuring apparatus in the horizontal or vertical plane; slots for marking the position of the boxes; and a set of indicia on the left and right edge of the front side for indicating the distance from the first end; whereby the measuring apparatus is a template for placing the boxes so that they are positioned to comply with applicable code requirements. The measuring apparatus further comprises portions of sections of the code.

The applicable codes and standards are the: National Electrical Code (NEC), American Disabilities Act (ADA), American National Standards Institute (ANSI), and Occupational Safety and Hazards Agency (OSHA).

The present invention is a reference tool, measurement apparatus, and a marking device directed toward precise installation of electrical boxes. A variety of spatial dimensions pertain to the installation of electrical boxes. The acceptable ranges of these dimensions have been standardized by a number of organizations. Such standards and codes include the: ANSI Standard, NEC Code, ADA Code, and OSHA code. In practice, the application of these standards and codes is complicated, making installation of electrical boxes a time consuming, troublesome task. The reusable integrated electrician's apparatus of the present invention eliminates the need for knowledge of electrical codes and standards. It enables installation of electrical boxes to proceed in compliance with the codes and standards in an expeditious, cost effective manner especially when the floor is not flat.

The integrated electrician's measuring apparatus comprises a set of levels for leveling the length of the apparatus horizontally and for determining if the apparatus is vertical. The measuring apparatus is six feet long, about two to four inches wide, and about $3/16$ inches thick. This large width is adequate to position the apparatus firmly on a floor that is not flat or in level. Advantageously, it is enables the device to pick the highest point on the floor as a resting point for the first end. In a second embodiment, the first end is provided with a heel plate that is hinged or welded to the elongated body. With this construction, the contact area between the device and the floor is increased, enabling the device to the highest point on an irregular floor when setting up the integrated electrician's apparatus. The width of two to four inches represents the average width of a switch, plug or electrical box. When the apparatus is leveled vertically using the levels, the first end of the apparatus defines a horizontal line that extends from the highest point of the floor on which the apparatus rests. The indicia marked on the left and right edge of the front side of the apparatus therefore represent equal distances from the first end and form an imaginary horizontal line drawn through the highest point on the floor. In the event that the floor is irregular, these indicia measurements do not measure distance from the floor at each edge; but instead measure distances from an imaginary horizontal line drawn at the highest point on the floor, contacting the first end of the apparatus. Therefore, marking off selected equal distances on the indicia using left and right edges on the front side of the apparatus and drawing a line between the marked points results in a line that is horizontal. This drawn line is also located at the selected distance from an imaginary horizontal line drawn from the highest point on an irregular floor. The large width of the apparatus, which is two to four inches wide, facilitates placement of markings which when joined by a line drawn therebetween assure that the line thereby created is horizontal. If the width of the apparatus were small, for example $3/4$ of an inch, a line drawn between markings created by indicia on left and right edges of the apparatus, would not likely be horizontal. Moreover, the large width of the apparatus, which is two to four inches wide, enables an end thereof to sample a significant portion of an irregular floor to thereby pick the highest point on the floor and provide a more precise measurement. Use of a heel plate as described hereinabove increases the area of contact between the heel plate and the floor facilitating sampling of the highest point thereon in a highly reliable manner.

Optionally the elongated body of the apparatus may include a hinge adapted to fold the apparatus for easy transportation. Preferably, the hinge may be located nearly half way between the first and second ends to result in a compact folded integrated electrician's measuring apparatus.

The present invention facilitates placement of electrical boxes in accordance with applicable codes using a single integrated tool rather than a plethora of tools. Compliance with applicable codes and standards is improved and errors are virtually eliminated. Installation of electrical boxes is accomplished accurately in a highly reliable, cost effective manner.

BRIEF DESCRIPTION OF THE DRAWINGS

The invention will be more fully understood and further advantages will become apparent when reference is made to the following detailed description of the preferred embodiment of the invention and the accompanying drawings, in which:

FIG. 2 is a side view illustrating a portion of code on the reverse side of the integrated electrician's measuring apparatus shown in FIG. 1;

DESCRIPTION OF THE PREFERRED EMBODIMENT

The present invention relates to an integrated electrician's measuring apparatus for measuring a variety of spatial dimensions pertaining to the installation of electrical boxes. The acceptable ranges of these dimensions have been standardized by a number of organizations. These standards and codes include: ANSI Standard, NEC Code, ADA Code, and OSHA code.

Figure 1:
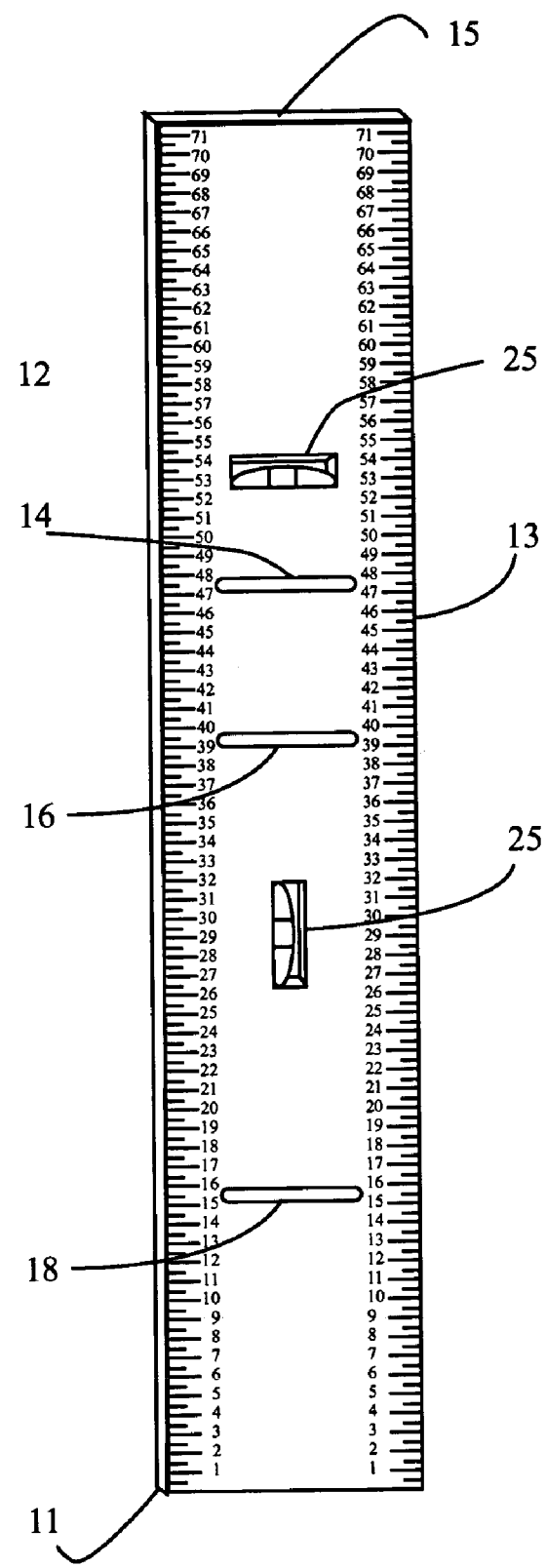
FIG. 1 is a frontal view of an integrated electrician's measuring apparatus constructed in accordance with the present invention.

Referring to FIG. 1 of the drawings, there is shown a measuring apparatus for marking and locating the position of electrical boxes. Generally stated, the measuring apparatus comprises: an elongated body 10 having a first end 11 and second end 15. The measuring apparatus contains slots 14, 16, and 18 for marking the position of the boxes. A set of indicia 12 and 13 at left and right edges of the front side of the apparatus indicate the distance from the first end 11 of the measuring apparatus, whereby the measuring apparatus provides a template for placing the boxes so that they are positioned to comply with applicable code requirements. The indicia are on both left and right edges of the apparatus, as shown by 12 and 13 in FIG. 1. The elongated body 10 also carries two sets of levels 25 to indicate if the elongated body is positioned horizontally or vertically. The levels are shown as bubble levels, although other forms of levels may be used with equal effect.

Typically, the apparatus is composed of a metal, such as aluminum. It is preferably about six feet long, about two to four inches wide, and about $3/16$ inches thick. In order to show the entire apparatus, the illustration in FIG. 1 is exaggerated with respect to its width.

In operation, the user locates the installation height for an electrical box by placing the apparatus with end 11 on the floor which may or may not be flat and in level and vertically against the wall designated to receive the box. The end 11 contacts the floor at its highest point, and the integrated electrician's apparatus is tilted when in contact with the wall. In this manner the long length of the apparatus is leveled using horizontal level 25, so that it is vertical. The appropriate slot is chosen and a pencil is inserted in the slot to mark off the position of the box on the wall. The apparatus is also used to determine the horizontal placement of electrical boxes. The length of the apparatus is the maximum allowable distance between outlet boxes.

Slot 18 is placed at about 16 inches from end 11 and used to mark the placement of outlet boxes. Slot 18 is also used to determine standard placement of wall studs. Slot 16 at 40 inches from end 11 is used to determine the height of counter height outlets, while slot 14 at 48 inches from end 11 is for standard wall switches.

Optionally, as shown in FIG. 2, textual portion 22 of selected code is printed on the reverse side of the measuring apparatus 20 for quick reference by the user. The printed portion is taken from applicable codes such as National Electrical Code (NEC), American Disabilities Act (ADA), American National Standards Institute (ANSI), and Occupational Safety and Hazards Agency (OSHA). Portions of different codes may be placed on the apparatus, or the apparatus can be dedicated specifically to a single code.

Figure 3:
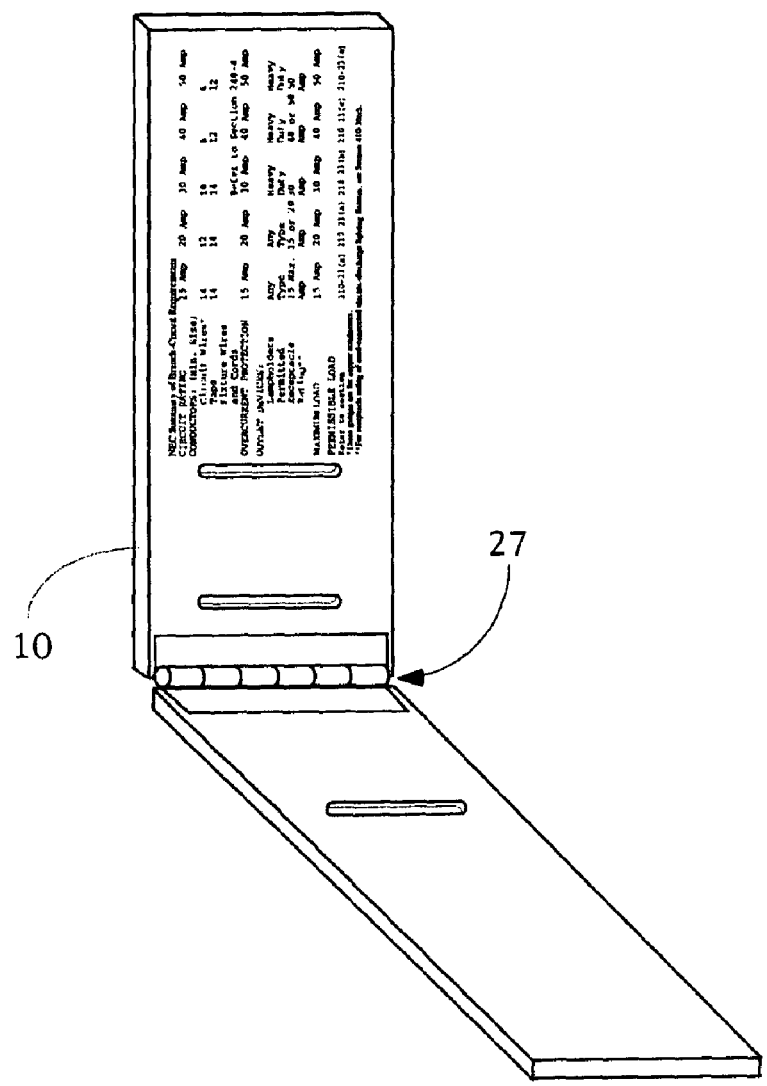
FIG. 3 is a frontal view of an integrated electrician's measuring apparatus constructed with a hinges in the middle of an elongated body.

As a further option, shown in FIG. 3, the measuring apparatus is provided with means for folding. Typically, such folding means comprises one or more hinges spanning the width of the elongated body at 27 placed along the length of the integrated electrician's measuring apparatus.

Figure 4:
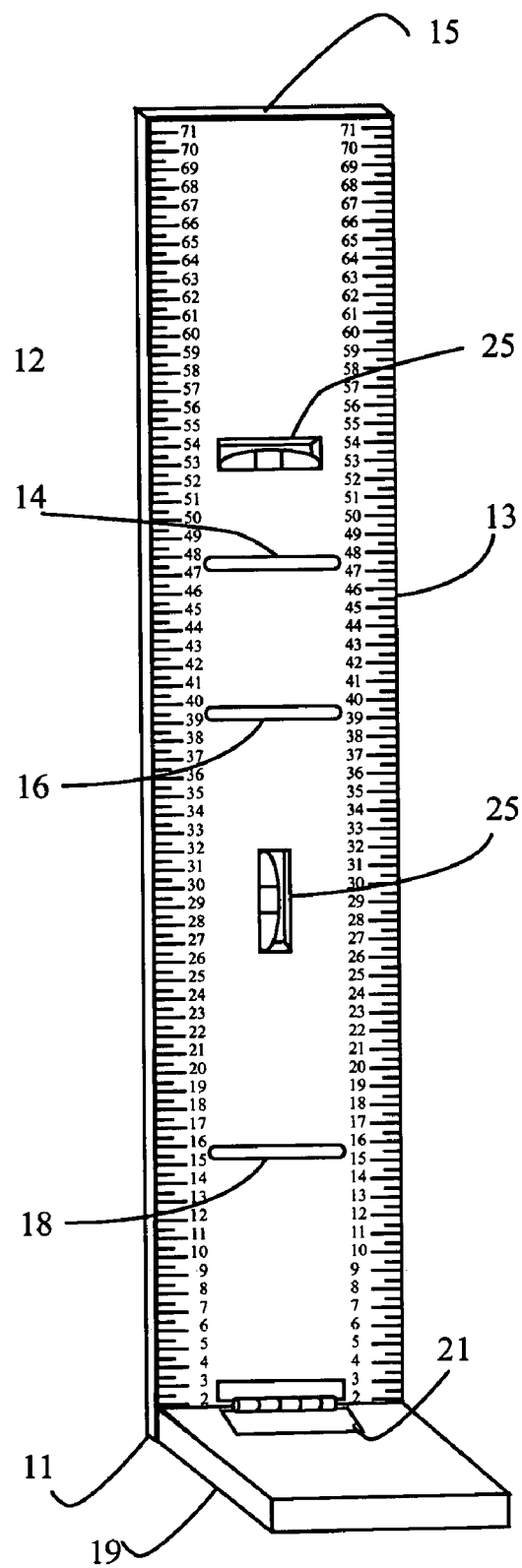
FIG. 4 is a frontal view of an integrated electrician's measuring apparatus constructed in accordance with the second embodiment of the invention, the first end of the apparatus has a heel plate incorporated therein.

Optionally, as shown in FIG. 4, a heel plate 19 may be attached to the first end 11 to improve the contact between the integrated electrician's apparatus and the floor in picking the highest point on the floor. The heel plate at 19 may be hinged at 21 to the elongated body 10 as shown in the figure or welded. In either case the heel plate is perpendicular to the elongated body 10 with the bottom side of the heel plate 19 located at the zero marking in the indicia as shown.

The present invention facilitates placement of electrical boxes in accordance with applicable codes, thus eliminating errors even if the floor is irregular. The electrical boxes, switches and plugs may be positioned in a horizontal plane at a precise height above the highest point on an irregular floor, meeting all code requirements without use of any tool other than the integrated electrician's measuring apparatus.

Having thus described the invention in rather full detail, it will be understood that such detail need not be strictly adhered to but that further changes and modifications may suggest themselves to one skilled in the art all falling within the scope of the invention as defined by the subjoined claims.

What is claimed is:

1. An integrated electrician's measuring apparatus for marking and locating the position of outlet boxes, counter height outlets, and standard wall switches comprising:
   a) a substantially flat elongated body having a first end, a second end, a front side a back side, and a longitudinal axis, wherein said elongated body has a length of about 6 feet for determining horizontal placement of the outlets from one another in accordance with a selected standard or code;
   b) a first horizontal slot disposed on said elongated body at a first location, said first horizontal slot being arranged perpendicularly to the longitudinal axis of said elongated body, said first horizontal slot determining placement of the outlet boxes in accordance with said selected standard or code such that the placement of a single outlet box may be marked;
   c) a second horizontal slot disposed on said elongated body at a second location, said second horizontal slot being arranged perpendicularly to the longitudinal axis of said elongated body, said second horizontal slot determining placement of the counter height outlets in accordance with said selected standard or code such that the placement of a single counter height outlet may be marked;
   d) a third horizontal slot disposed on said elongated body at a third location, said third horizontal slot being arranged perpendicularly to the longitudinal axis of said elongated body, said third horizontal slot determining placement of the standard wall switches in accordance with said selected standard or code such that the placement of a single standard wall switch may be marked;
   e) a set of indicia on each edge of said front side for indicating the distance from said first end;
   f) a level for leveling the length of said apparatus vertically; and
   g) means for folding said substantially flat elongated body for easy transportation, wherein said means for folding comprises at least one hinge spanning the width of the substantially flat elongated body;

whereby said measuring apparatus positions said outlet boxes, counter height outlets, and standard wall switches in level at precise locations above regular and irregular floors in compliance with applicable requirements of said standards and codes.

2. An apparatus as recited by claim 1, further including a textual portion of said code or standard.

3. An apparatus as recited by claim 1, wherein the substantially flat elongated body at the first end has a width of two to four inches.

* * * * *